United States Patent [19]
Strobl

[11] Patent Number: 5,273,369
[45] Date of Patent: Dec. 28, 1993

[54] SHEET METAL BEARING FOR AN ELECTRIC MOTOR

[75] Inventor: George Strobl, Repulse Bay Garden, Hong Kong

[73] Assignee: Johnson Electric S.A., Switzerland

[21] Appl. No.: 902,927

[22] Filed: Jun. 23, 1992

[30] Foreign Application Priority Data

Jul. 2, 1991 [GB] United Kingdom ............ 9114291

[51] Int. Cl.⁵ .................................... F16C 23/04
[52] U.S. Cl. ..................... 384/206; 384/192; 384/275
[58] Field of Search ............ 384/192, 206, 207, 211, 384/275; 310/90

[56] References Cited

U.S. PATENT DOCUMENTS

| | | |
|---|---|---|
| 3,967,710 | 7/1976 | Ernst et al. |
| 4,368,572 | 1/1983 | Kanazawa et al. ........ 384/206 X |
| 4,623,810 | 11/1986 | Smith ......................... 310/90 |

FOREIGN PATENT DOCUMENTS

| | | | |
|---|---|---|---|
| 3332323 | 3/1985 | Fed. Rep. of Germany | 384/192 |
| 220818 | 7/1942 | Switzerland | 384/192 |
| 0488161 | 1/1938 | United Kingdom | |
| 0537569 | 3/1940 | United Kingdom | |
| 1310984 | 3/1973 | United Kingdom | |

OTHER PUBLICATIONS

Metal Finishing; J. Henry; "A New Fluorinated Electroless Nickel Codeposit" pp. 15-18, and three charts; Oct. 1990.

Primary Examiner—Thomas R. Hannon
Attorney, Agent, or Firm—Ostrolenk, Faber, Gerb & Soffen

[57] ABSTRACT

A self-aligning bearing for a fractional-horsepower PMDC electric motor is formed from sheet metal coated with polytetrafluoroethylene to facilitate intermittent, short-term operation. A tubular first part provides a journal-bearing surface. A second part extends radially from a first end of the first part to provide radial support for the first part. A third part extends axially from a radially outer second end of the second part so as to surround the first part and is provided with a part-spherical outer mounting surface for engagement with a bearing support.

7 Claims, 1 Drawing Sheet

SHEET METAL BEARING FOR AN ELECTRIC MOTOR

FIELD OF THE INVENTION

The invention relates bearings for fractional-horsepower PMDC electric motors having shafts of, typically, 2 to 4 mm diameter. These bearings can be produced from sheet metal and then coated on their load bearing surfaces with friction-reducing material. Bearings such as these are particularly, but not exclusively, suitable for use as self-aligning bearings.

BACKGROUND ART

A bearing for a fractional-horsepower PMDC electric motor conventionally comprises a first part having axially spaced first and second ends and providing a journal-bearing surface, a second part having radially inner and outer first and second ends which is connected to the first part and provides radial support for the first part, and a third part for engagement with a bearing support. Thus, for a self-aligning bearing having a cylindrical journal-bearing surface and a part-spherical outer surface engageable with the bearing support, the first, second and third parts constitute radially inner, intermediate and outer parts of a ring member and, to provide lubrication, the ring member is normally formed from sintered material which is sufficiently porous to hold, typically, up to 20% of its volume of lubricating oil.

Bearings of this construction function quite satisfactorily, but the cost of manufacture is significant, particularly where the outer surfaces of the bearings have to be part-spherical for self-aligning purposes. Moreover, in some applications, for example: car door locking motors, where the motor is only required to operate intermittently for a small number of revolutions the major problem is reducing static friction, or "stiction". There is insufficient time to develop a friction-reducing oil film and so the cost of providing a lubrication bearing is wasted. In fact, the presence of oil which does little to reduce friction can cause damage by flowing onto the contact surfaces of the commutator because, as a result of the limited operation of the motor, there is insufficient heat to burn this oil to thereby prevent the formation of an insulating coating.

DISCLOSURE OF THE INVENTION

The purpose of the present invention is to provide a bearing for a fractional-horsepower PMDC electric motor which can be more economically manufactured than conventional bearings such as sintered bearings.

This is achieved by providing a bearing of sheet metal in which the first, second and third parts are of sheet metal, the first part is tubular, the first end of the second part is connected to the first end of the first part, the third part of the bearing is connected to the second end of one of the first and second parts, and the bearing is coated, at least on the journal-bearing surface of the first part, with non-liquid friction-reducing material.

Thus, according to the invention, there is provided a bearing, for a fractional-horsepower PMDC electric motor, comprising a tubular first part having axially spaced first and second ends and providing a journal-bearing surface; a second part having radially inner and outer first ends connected, at its first end, to the first end of the first part and providing radial support for the first part; and a third part connected to the second end of the first part or to the second end of the second part for engagement with a bearing support, the first, second and third parts being of sheet metal and at least the journal-bearing surface of the first part being coated with a non-liquid friction-reducing material.

By this means, it is possible to form a bearing from sheet metal by a simple pressing and/or swaging or spinning process.

The non-liquid friction-reducing material may comprise a fluorocarbon polymer such as polytetrafluoroethylene (PTFE) which may be applied to the sheet metal, in known manner, before the sheet metal is subjected to the forming process to produce bearings. Moreover, where the bearings are formed from a continuous strip of sheet metal, the entire outer surface of the strip need not be coated, as in an immersion coating process, but may be coated, for example: by spraying, on only that much of one side of the strip as is necessary to ensure that the journal-bearing surface of the tubular first part of each bearing is coated with friction-reducing material. Although this will normally involve unnecessarily coating parts of the surface of the bearing other than the required journal-bearing surface, reduction in the amount of friction-reducing material can result in substantial cost saving.

Unfortunately, this economising measure is offset by the fact that although precoating may facilitate the metal-working forming process, the forming process inevitably damages the coating. It has therefore been found better to form the bearings from uncoated sheet metal and then to coat the entire surface of each bearing in an immersion coating process.

Immersion coating processes, for this purpose, may be used to provide very satisfactory fluorocarbon polymer coats. However, in view of factors such as the difficulties encountered in the provision and maintenance of uniform coating thickness on the journal-bearing surface of the tubular first part of each bearing, better results are obtainable by use of the known process of electroless codeposition of nickel and fluorocarbon polymer particles to form a composite coating in which fluorocarbon polymer particles are dispersed within a layer of nickel. Best results, so far, have been obtained in a codeposition process such as this in which the fluorocarbon polymer particles are of PTFE.

In a preferred embodiment, the third part is connected to the radially outer second end of the second part and extends axially, around the first part, so as to provide an outer mounting surface engageable with the bearing support. This outer mounting surface may be cylindrical or, where the bearing is a self-aligning bearing, part-spherical, having a maximum diameter, perpendicular to the axis of the bearing, in a plane spaced from the second part of the bearing, which is greater than the diameter of the second part of the bearing. In order to form such a part-spherical outer mounting surface, the second part may be formed with at least three circumferentially extending segments which are separated by cuts which extend from an edge of the third part which is remote from the second part. The cuts may extend beyond the hereinbefore mentioned plane in which the part-spherical mounting surface has its maximum diameter and, in order to facilitate formation of the part-spherical surface, the blank from which the bearing is pressed may be relieved by removing sheet metal on opposite sides of each cut, in a preliminary stamping process.

In an alternative form of construction, which is particularly suitable for use with a bearing support of resiliently deformable material, the second part of the bearing is planar and extends perpendicular to the axis of the bearing and the third part of the bearing extends radially outwardly, at least partially, for example: by diverging radially from the second end of the first part. The bearing support of a bearing assembly incorporating a bearing such as this has a planar support surface extending perpendicular to the axis of the bearing, an abutment surface facing away from the planar support surface, and a circular-section aperture tapering from the planar support surface to the abutment surface. In an assembly such as this, the resilience of the bearing support material, the resilience of the bearing itself, and the outer diameter of the third part of the bearing are such that the third part can pass through the aperture and snap into position with the first part of the bearing disposed within the aperture and supported at its second end by the bearing support material around the aperture, with the second part in engagement with the planar support surface of the bearing support, and with the third part in engagement with the abutment surface so as to hold the second part of the bearing in engagement with the planar support surface.

In a bearing assembly such as this, the first end of the first part of the bearing is given radial support by the second part of the bearing making frictional contact with the planar support surface of the bearing support and the second end of the first part is given radial support by the bearing support material engaging the third part of the bearing. However, if the shaft supported by the bearing is not aligned with the axis of the bearing, the bearing is able to tilt into a self-aligning position. In this case, the planar second part of the bearing slides over the planar support surface of the bearing support. The movement of the first end of the first part of the bearing is accommodated within the tapering aperture formed in the bearing support.

Two bearings embodying the present invention are hereinafter described, by vary example, with reference to the accompanying drawings.

BEST MODES FOR CARRYING OUT THE INVENTION

Figure 1:
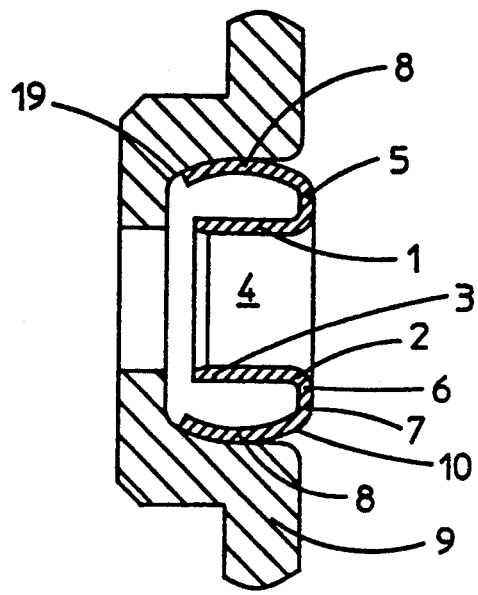
FIG. 1 is a cross-sectional elevation of an assembly incorporating a first bearing according to the present invention.

As shown in FIG. 1, a sheet metal bearing has a first part 1, providing a journal-bearing surface 4 which is coated with non-liquid friction-reducing material such as polytetrafluoroethylene, or some other solid lubricant material, and this first part 1 has first and second ends 2 and 3. The bearing also has a second part 5 extending radially from the first end 2 of the first part 1. The second part 5 has radially inner and outer first and second ends 6 and 7 respectively connected to the first end 2 of the first part 1 of the bearing and to a third part 8 of the bearing extending axially around the first part 1.

The third part 8 of the bearing has a part-spherical outer mounting surface 10 which is seated in a part-spherical seat 19 formed in a bearing support 9.

The friction-reducing coating on the journal-bearing surface 4 reduces static friction between the journal-bearing surface 4 and a shaft (not shown) mounted in the bearing. If the shaft is not exactly aligned with the axis of the bearing, the bearing is able to align itself with the shaft by virtue of its part-spherical outer mounting surface 10 engaging the part-spherical seat 19 form in the bearing support 9.

Figure 2:
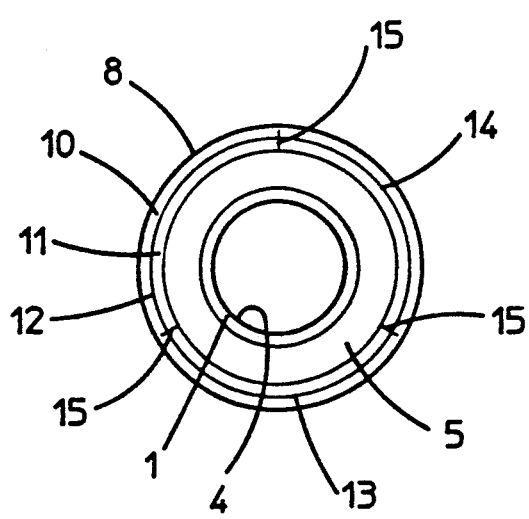
FIG. 2 is an end elevation of the bearing shown in FIG. 1.
Figure 3:
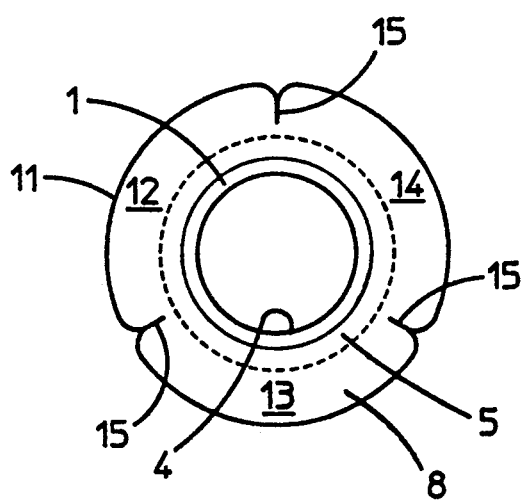
FIG. 3 is an end elevation of a blank which has been partly formed in the process of producing a bearing as shown in FIG. 2.

As shown in FIGS. 2 and 3, formation of the part-spherical mounting surface 10 is facilitated by providing cuts 15 which extend radially inwards from the edge 11 of the blank from which the bearing is formed. The cuts 15 divide the third part 8 of the bearing into three circumferentially extending segments 12, 13 and 14.

As shown in FIG. 3, the blank is notched to provide relief between the circumferentially extending segments 12, 13 and 14 and thereby facilitate formation of the part-spherical outer mounting surface 10.

Figure 4:
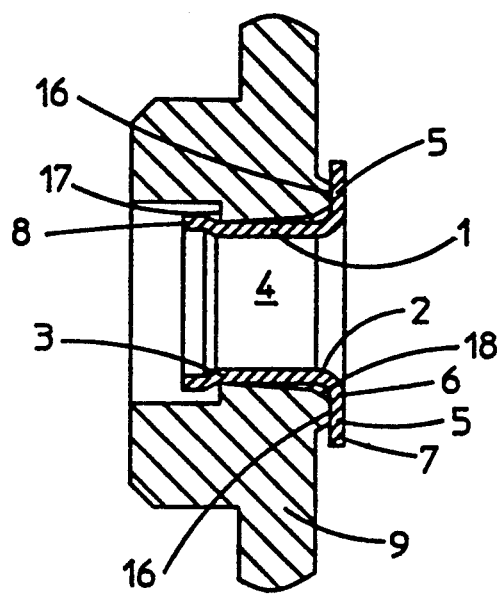
FIG. 4 is a sectional side elevation of an assembly incorporating a second bearing according to the present invention.

In the bearing assembly shown in FIG. 4 the third part 8 of the bearing, adjacent the first part 1, extends radially outwardly by diverging radially from the second end 3 of the first part 1 instead of extending axially from the second end 7 of the second part 5, as in embodiment illustrated in FIGS. 1 to 3.

In addition, the bearing support 9 is provided with a planar support surface 16, extending perpendicular to the axis of the bearing, and abutment surface 17 facing away from the planar support surface 16. In addition, the bearing support 9 is provided with an aperture 18 which tapers, in two stages, from the planar support surface 16 to the abutment surface 17. And the bearing support 9 is made from resiliently deformable of material such as moulded plastic.

The bearing is dimension so that, as a result of the resilience of the material of the bearing support 9 or of the bearing itself, the third part 8 of the bearing can be pressed through the aperture 18 to snap into position with the third part 8 engaging the abutment surface 17 so as to hold the second part 5 of the bearing in frictional engagement with the planar support surface 16 and so that the bearing support material surrounding the aperture 18 provides radial support for the second end 3 of the first part 1 of the bearing.

Radial support for the first end 2 of the first part 1 of the bearing is provided by frictional engagement of the second part 5 with the planar support surface 16.

If the shaft is not precisely aligned with the axis of the bearing, the bearing is able to tilt as a result of frictional movement between the second part 5 of the bearing over the planar support surface 16 and movement of the first part 1 of the bearing within the tapered aperture 18.

In practice, the surface of the aperture 18 need only diverge from the second end 3 of the first part 1 of the bearing at an angle of 2 to 3 degrees. For the sake of clarity, the angle of divergence shown in FIG. 4 has been greatly exaggerated.

As in the first embodiment, the journal-bearing surface 4 provided internally of the first part 1 of the bearing is coated with friction-reducing material to reduce static friction between the bearing and a shaft mounted in the bearing. However, in this case, the coating on the journal-bearing surface 4 is part of an electroless codeposit which covers all surfaces of the bearing and comprises PTFE particles dispersed within a layer of nickel.

Clearly, whenever all surfaces of a bearing according to the invention are coated with a non-liquid friction-reducing material, precautions must be taken to ensure that the reduction of friction on any particular surface does not detract from performance of the bearing. Thus, in the second embodiment of the invention, shown in FIG. 4, which depends on frictional engagement between the inner surface of the second part 5 and the surface 16 of the bearing support 9, the size and the pressure between the engaging surfaces must be adjusted to provide the required friction. If this is impracticable, the coating of friction-reducing material should not be applied to this particular surface of the bearing. Another surface subject to this consideration would be the outer mounting surface 10 of the first embodiment shown in FIG. 1 to 3.

The sheet metal forming bearings according to the invention may be of any bearing metal, such as brass, but in the case of the first embodiment shown in FIGS. 1 to 3, bronze is preferred to brass because of its greater resilience.

What is claimed is:

1. A sheet metal, self-aligning bearing, for a fractional-horsepower PMDC electric motor, comprising:
    a tubular first part having axially spaced first and second ends and a journal-bearing surface which is coated with non-liquid friction-reducing material;
    a second part, for providing radial support for the first part, having a first end connected to the first end of the first part and a radially outer second end; and
    a third part, for engagement with a bearing support, having a first end connected to the second end of the second part, an axially spaced second end which is axially adjacent and radially spaced from the second end of the first part, and an outer, part-spherical mounting surface engageable with the bearing support and having a maximum diameter, as measured perpendicular to the axis of the bearing, in a plane spaced from the second part, which is greater than the diameter of the second part, the axial extent of the first and third parts being substantially the same.

2. A bearing according to claim 1 in which all surfaces are coated with non-liquid friction-reducing material.

3. A bearing according to claim 1 in which all surfaces are coated with an electroless codeposit comprising fluorocarbon polymer particles dispersed within a layer of nickel.

4. A bearing according to claim 1 in which the third part of the bearing is formed with an edge remote from the second part of the bearing and at least three circumferentially extending segments which are separated by cuts which each extend, from the edge of the third part of the bearing, beyond the plane spaced from the second part of the bearing.

5. A bearing for a fractional-horsepower PMDC electric motor comprising a first part having axially spaced first and second ends and providing a journal-bearing surface; a second part having radially inner and outer first and second ends and providing radial support for the first part; and a third part for engagement with a bearing support;
    characterised in that:
    the first, second and third parts are of sheet metal;
    the first part is tubular;
    the second part is connected, at its first end to the first end of the first part;
    the third part is connected to the radially outer second end of the second part and extends axially, around the first part, so as to provide a part-spherical outer mounting surface engageable with the bearing support and having a maximum diameter, perpendicular to the axis of the bearing, in a plane spaced from the second part of the bearing, which is greater than the diameter of the second part of the bearing;
    the third part of the bearing is formed with an edge remote from the second part of the bearing and at least three circumferentially extending segments which are separated by cuts which each extend, from the edge of the third part of the bearing, beyond the plane spaced from the second part of the bearing; and
    all surfaces of the bearing are coated with an electroless codeposit comprising fluorocarbon polymer particles dispersed within a layer of nickel.

6. A bearing assembly comprising:
    (a) a bearing for a fractional-horsepower PMDC electric motor, the bearing including:
        (1) a tubular first part having axially spaced first and second ends and a journal bearing surface coated with a non-liquid friction-reducing material;
        (2) a second part having a radially inner and outer first and second ends and providing radial support for the first part, the second part being connected at its first end to the first end of the first part; and
        (3) a third part for engagement with a bearing support, the third part being connected to and extending radially outward from the second end of the first part; the first, second and third parts being formed of sheet metal;
    (b) a bearing support in which:
        (1) the bearing support has a planar support surface extending perpendicular to the axis of the bearing, an abutment surface facing away from the planar support surface, and a circular-section aperture tapering from the planar support surface to the abutment surface;
        (2) the first part of the bearing is disposed within the aperture in the bearing support;
        (3) the second part of the bearing is planar and extends perpendicular to the axis of the bearing in engagement with the planar support surface of the bearing support;
        (4) the third part of the bearing extends radially outwardly, at least partially, from the second end of the first part of the bearing so as to engage the abutment surface and thereby hold the second part of the bearing in engagement with the planar support surface of the bearing support; and
        (5) the resilience of the bearing support material, the resilience of the bearing itself, and the other diameter of the third part of the bearing being such that the third part can pass through the aperture and snap into position.

7. A bearing assembly according to claim 6 in which the third part of the bearing extends radially outwardly by diverging radially from the second end of the first part of the bearing.

* * * * *